United States Patent [19]

Hawley et al.

[11] Patent Number: 5,705,579
[45] Date of Patent: Jan. 6, 1998

[54] OLEFIN POLYMERIZATION

[75] Inventors: Gil R. Hawley, Dewey, Okla.; Timothy M. Ramsey, Spartan, N.J.; Ronald L. Halterman, Norman; Darryl R. Fahey, Bartlesville, both of Okla.

[73] Assignee: Phillips Petroleum Company, Bartlesville, Okla.

[21] Appl. No.: 682,223

[22] Filed: Jul. 17, 1996

[51] Int. Cl.$^6$ .................. C08F 4/42; C08F 4/64
[52] U.S. Cl. .............. 526/160; 526/351; 526/943; 502/117; 502/152
[58] Field of Search ................. 526/160, 351, 526/943

[56] References Cited

U.S. PATENT DOCUMENTS

| | | | |
|---|---|---|---|
| 4,871,705 | 10/1989 | Hoel | 502/117 |
| 5,239,022 | 8/1993 | Winter et al. | 526/127 |
| 5,304,523 | 4/1994 | Razavi | 502/152 |
| 5,391,789 | 2/1995 | Rohrmann | 556/11 |
| 5,416,228 | 5/1995 | Ewen et al. | 556/7 |
| 5,491,207 | 2/1996 | Hoel | 526/129 |
| 5,594,080 | 1/1997 | Waymouth et al. | 526/126 |

OTHER PUBLICATIONS

*Chemical and Engineering News*, Jan. 16, 1995, pp. 6 and 7.
*Science*, 267, Jan. 13, 1995, p. 191.
*Science*, 267, Jan. 13, 1995, pp. 217–218.
*Journal of Organometallic Chemistry*, 465, (1994), pp. 175–179.
*SPO '92 Paper*, Dr. Abbas Razavi, 1992, p. 177.

*Primary Examiner*—David W. Wu
*Attorney, Agent, or Firm*—Edward L. Bowman

[57] ABSTRACT

A catalyst system comprising an unbridged bis(2-aryltetrahydro-indenyl) metallocene and a cocatalyst and its use in the polymerization of olefins, especially olefins having 3 or more carbon atoms.

17 Claims, No Drawings

OLEFIN POLYMERIZATION

FIELD OF INVENTION

The present invention relates to the polymerization of olefins using metallocenes. In particularly preferred embodiments, the present invention relates to the polymerization of olefins having at least 3 carbon atoms.

BACKGROUND OF THE INVENTION

It is well known that olefins having 3 or more carbon atoms are capable of being polymerized to form polymers having different types of stereospecific microstructure. Syndiotactic polymers are generally viewed as having a stereochemical structure in which the monomeric units have enantiomorphic configuration of the asymmetrical carbon atoms that follow each other alternatively and regularly in the main polymer chain. Isotactic polymers are typically described as having long sequences of monomer units with the same relative configuration of the tertiary carbon atoms. In atactic polymers the stereo centers are randomly positioned. Polymers having high levels of isotactic or syndiotactic character are generally crystalline solids and are insoluble in xylene. Atactic polymers are generally soluble in xylene and are gums or liquids.

For particular applications, it is desirable to have high levels of isotactic structure in the polymer. A few very specific types of metallocenes have been found to have isotactic stereoselectivity. Examples include the racemic ethylene bridged bis(indenyl) and the racemic ethylene bridged tetrahydroindenyl zirconium dichlorides. These bridged racemic metallocene isomers must, however, be isolated from mixtures of the racemic and meso isomers in order to produce a catalyst material which is isotactic stereoselective. This separation can be difficult and expensive.

So far as the present applicants are aware only one unbridged metallocene has been reported as being capable of producing high levels of isotactic microstructure. That metallocene is bis(1-methyl fluorenyl) zirconium dichloride as disclosed in U.S. Pat. No. 5,304,523.

One object of the present invention is to provide a new method for polymerizing olefins. A particularly preferred object of the present invention is to provide a method for producing polymer from olefins having at least 3 carbon atoms with high levels of isotactic microstructure using an unbridged metallocene which is more easily prepared than bridged metallocenes. Another object is to provide a metallocene which is stereoselective without having separate racemic and meso isomers.

Other aspects, objects, and advantages of the present invention will become apparent from a review of the following disclosure.

SUMMARY OF THE INVENTION

In accordance with the present invention, there is provided a process for polymerizing olefins having at least 3 carbon atoms comprising contacting said olefin with a metallocene and a suitable cocatalyst, wherein the metallocene is a bis(2-aryl-4,5,6,7-tetrahydroindenyl) unbridged metallocene of metals of Group IVB, wherein the aryl group is either unsubstituted or substituted with hydrocarbyl or hydrocarbyloxy substitutents.

DETAILED DESCRIPTION OF THE INVENTION

The bis(2-aryl tetrahydroindenyl) metallocenes employed in the present invention include those of the formula

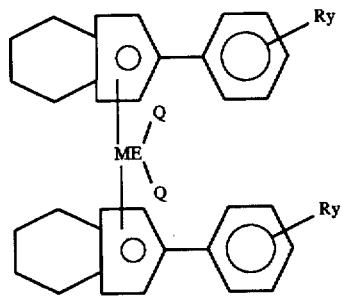

wherein each R is a hydrocarbyl and hydrocarbyloxy radical having from 1 to 20 carbon atoms, y is an integer number in the range of 0 to 3; Me is a metal of Group IVB. Each Q is a hydride, halide, or a hydrocarbyl radical such as an aryl group, or a linear, branched, or cyclic alkyl group. The metal Me is preferably either zirconium and hafnium.

Some examples of such compounds include bis(2-phenyl tetrahydroindenyl) zirconium dichloride; bis(2-(para-methoxyphenyl) tetrahydroindenyl) zirconium dichloride; bis(2-(para-methylphenyl) tetrahydroindenyl) zirconium dichloride; bis(2-(para-methoxyphenyl) tetrahydroindenyl) zirconium dimethyl; bis(2-(para-methylphenyl) tetrahydroindenyl) zirconium dimethyl; bis (2-(ortho-methoxyphenyl) zirconium dichloride; bis(2-(meta-methoxyphenyl) zirconium dichloride; bis(2-(ortho, para-dimethoxyphenyl) zirconium dichloride and the like. Techniques for producing some metallocenes of this type are disclosed in the article *J. Orgomet. Chem.*, 465, 175–179 (1994).

The above named types of metallocenes are suitable for producing polymers from olefins, including ethylene, and particularly for producing molecules having isotactic microstructure using olefins having 3 or more carbon atoms. Examples of olefins having 3 or more carbon atoms include propylene, butene-1,pentene-1,3-methylbutene-1,hexene-1, 4-methylpentene-1,3-ethylbutene-1,heptene-1,octene-1, decene-1, 4,4-dimethyl-1-pentene, 4,4-diethyl-1-hexene, 3,4-dimethyl-1-hexene, and the like. It is within the scope of the present invention to employ the catalyst systems in the preparation of homopolymers. It is also within the scope of the present invention to employ the catalyst systems or the polymerization of mixtures of two or more of such alpha-olefins. It is further within the scope of the present invention to employ the catalyst systems in the polymerization of one or more of the alpha-olefins in combination with ethylene. Typically if ethylene is used in an amount such that the resulting polymer contains less than 80 weight percent ethylene, one obtains a polymer which is more generally referred to as a thermoelastomer rather than a thermoplastic. A typical example would be an ethylene-propylene copolymer having at least 20 weight percent of incorporated propylene monomer.

The bis(2-aryl tetrahydroindenyl) metallocenes can be activated to produce a catalyst system suitable for the polymerization of olefin monomers by using a suitable cocatalyst. It is contemplated that the metallocenes can be activated using generally any of the techniques that in the past have been suitable for activating other similar metallocenes, including using a stable non-coordinating counter ion such as disclosed in U.S. Pat. No. 5,155,080, i.e. a triphenyl carbenium tetrakis (pentafluorophenyl) boronate. Such polymerizations can be carded out in a homogeneous system in which the catalyst and cocatalyst are both soluble; however, it is also within the scope of the present invention to carry out the polymerization and slurry or gas phase conditions. Supported forms of the catalyst and/or cocatalyst can be employed. It is generally preferred that the support be a material that is insoluble in the polymerization medium being employed.

Examples of typical co-catalysts include generally any of those organometallic cocatalysts which have in the past been employed with transition metal-containing olefin polymerization catalysts. Some typical examples include organometallic compounds of metals of Group IA, IIA, and IIB of the Periodic Table. Examples of such compounds having included organometallic halide compounds, organometallic hydride compounds, and metal hydrides. Some specifically preferred examples include triethylaluminum, triisobutylaluminum, diethylaluminum chloride, diethylaluminum hydride, and the like.

The currently most preferred cocatalyst is an aluminoxane. Such compounds include those compounds having repeating units of the formula wherein R is an alkyl group generally having 1 to 5 carbon atoms. Such aluminoxanes, also sometimes referred to as poly(hydrocarbylaluminum oxides) are well known in the art and are generally prepared by reacting an organohydrocarbyl aluminum compound with water. Such preparation techniques are disclosed in U.S. Pat. Nos. 3,242,099 and 4,808,561, the disclosures of which are incorporated herein by reference. The currently preferred cocatalysts are prepared either from trimethylaluminum or triethylaluminum. Such aluminoxanes are often referred to as poly(methyl aluminoxide) or poly(ethyl aluminoxide), respectively. It is also within the scope of the present invention to use an aluminoxane in combination with a trialkylaluminum, such as disclosed in U.S. Pat. No. 4,794,096, the disclosure of which is incorporated herein by reference.

As noted above the catalyst can be formed upon admixture of a metallocene, preferably a zirconocene, as specified, with an aluminoxane. The catalyst system may be prepared as a non-supported catalyst by mixing the requisite metallocene and aluminoxane in a suitable diluent either in the presence or absence of monomers. The polymerization employing non-supported catalysts can be carried out either by solution or slurry polymerization procedures. The catalyst system can also be prepared and employed as a heterogeneous catalyst by adsorbing the requisite metallocene and/or aluminoxane components on a catalyst support material such as silica gel, alumina or other suitable organic or inorganic support material.

The support material for preparing a hetereogeneous catalyst may be a free polyolefin powder or a freely divided inorganic solid porous support, such as talc, silica, alumina, silica-alumina or mixtures thereof. Other inorganic oxides that may be employed either alone or in combination with silica or silica-alumina are magnesia, titania, zirconia, and the like. The inorganic oxides should be dehydrated, as is well known in the art, to remove water. If desired, the residual surface hydroxyl groups in the inorganic solid porous support may be removed by additional heating or by reaction with dehydroxylating agents such as lithium alkyls, silyl chlorides, aluminum alkyls, or preferably with aluminoxane. A preferred catalyst support is a dehydrated inorganic oxide treated with an aluminoxane, more preferably methylaluminoxane. A suitable support material is a dehydrated silica gel that is then treated with methylaluminoxane.

The normally hydrocarbon-soluble metallocene and aluminoxane can be as a heterogeneous supported catalyst by deposition on a support material, such as a dehydrated silica gel treated with methylaluminoxane. A suitable silica gel would have a particle diameter in the range 1–600 microns, preferably 10–100 microns; a surface area of 50–1000 m$^2$/g, preferably 100–500 m$^2$/g; and a pore volume of 0.5–3.5 cm$^3$/g. The silica gel may be heat treated at 100°–1000° C., preferably 300°–800° C. for a period of 1–100 hours, preferably 3–24 hours, to insure its use in dehydrated form.

The catalyst system obtained through contacting of the metallocene and the aluminoxane cocatalyst may be formed prior to introduction of these components into the reactor, or, alternatively, it may be formed in the reactor. In the case wherein a zirconocene is employed and the active system is formed in the reactor, the mole ratio of Al to Zr in the reactor is desirably in the range 10–5000, preferably 20–4000 and most preferably 20–1000. In the case that the active system is formed outside the reactor, the preferred ratio of Al to Zr is in the range 1–200, desirably 20–200. In this case, additional aluminoxane cocatalyst may be used in the reactor so that the total ratio of Al to Zr in the reactor is in the range 10–5000, preferably 20–4000 and most preferably 20–1000. Likewise, in this case, a small amount of another alkylaluminum compound, such as triethylaluminum or triisobutylaluminum, may be added to the reactor together with, or instead of, additional aluminoxane, for the purposes of scavenging any impurities or for other benefits. In all of the above, the catalyst or cocatalyst may be contacted in the reactor with one of the components already present on a suitable support.

As stated before, zirconocenes of the specified cases are the preferred metallocenes. Consequently further discussion of the catalyst will be with specific reference to zirconocenes although it should be understood that similar conditions and procedures are applicable to titanocenes and hafnocenes as well.

In one preferred technique for preparing a supported catalyst system a dehydrated silica gel is contacted with aluminoxane and subsequently with the zirconocene. If desired the zirconocene can, however, be added to a dehydroxylated support material prior to contacting the support material with an aluminoxane. In accordance with the preferred embodiment of this invention, the aluminoxane dissolved in a suitable inert hydrocarbon solvent is added to the support material either dry or slurried in the same or other suitable hydrocarbon liquid and thereafter the zirconocene is added to the slurry, preferably after drying the support under vacuum and reslurrying in a light hydrocarbon. In such an embodiment the zirconocene is added to the slurry in an amount sufficient to provide from about 0.02 to about 5.0 weight percent zirconium metal based on total catalyst weight. The zirconocene is more preferably added in an mount to provide from about 0.10 to about 1.0 weight percent zirconium metal based on total catalyst weight.

The treatment of the support material, as mentioned above, is conducted in an inert solvent. The same inert solvent or a different inert solvent is also employed to dissolve the zirconocene and aluminoxanes. Preferred solvents include the various hydrocarbons which are liquid at treatment temperatures and pressures and in which the individual ingredients are soluble. Illustrative examples of useful solvents include the alkanes such as propane, butane, pentane, isopentane, hexanes, heptanes, octanes and nonanes; cycloalkanes such as cyclopentane and cyclohexane; and aromatics such as benzene, toluene, xylenes, ethylbenzene and diethylbenzene. Sufficient solvent should be employed so as to provide adequate heat transfer away from the catalyst components during reaction and to permit good mixing.

The temperature employed during the production of the catalyst system can vary widely, such as, for example, from 0° to 100° C. Greater or lesser temperatures can also be employed. The reaction between the aluminoxane and the support material is rapid, however, it is desirable that the aluminoxane be contacted with the support material for about one half hour up to eighteen hours or greater. Preferably, the reaction is maintained for about one hour at 25°–100° C.

At all times, the individual ingredients as well as the recovered catalyst components must be protected from oxygen and moisture. Therefore, the reactions are performed in an oxygen and moisture free atmosphere and the catalyst is recovered in an oxygen and moisture free atmosphere. Preferably, therefore, the reactions are performed in the presence of an inert dry gas such as, for example, nitrogen. The recovered solid catalyst is maintained in the inert gas atmosphere.

Upon completion of the deposition of the zirconocene and aluminoxane on the support, the solid material can preferably be treated with a small amount of monomer, e.g. ethylene, to form an amount of polymer on the solid catalyst materials to increase the catalyst weight at least 50%, desirably from about 100 to about 500% based on the total weight of catalyst and support material. Such treatment is hereafter referred to as prepolymerization of the catalyst. Then the solid material, as such or as prepolymerized, can be recovered by any well-known technique. For example, the solid catalyst material can be recovered from the liquid by filtration, by vacuum evaporation, or by decantation. The solid is thereafter dried under a stream of pure dry nitrogen or dried under vacuum.

Prepolymerization of the solid catalyst material aids in obtaining an EPC elastomer produced therefrom during slurry polymerization in well-defined particle form. The prepolymerized catalyst may be rinsed with a hydrocarbon to provide the good granular particle form. Prepolymerization also greatly reduces the requirement for aluminoxane. For example, an Al:Zr ratio of about 1000:1 or greater for aluminoxane:zirconocene is needed for high activity when the aluminoxane is added to the liquid phase of the reactor, but a ratio less than about 100:1 can be sufficient when the aluminoxane is incorporated into the prepolymerized catalyst. For a prepolymerized catalyst the ratio of aluminum to zirconium would typically range from about 1:1 to 500:1, and more preferably from about 20:1 to 100:1, and high activities will still be obtained.

Most preferably, the supported catalyst is prepared in the following manner 1) forming a slurry by the addition of the aluminoxane dissolved in a suitable solvent, toluene for example, to the support; 2) stirring the slurry at 60°–80° C. for 30–60 minutes; 3) removal of solvent under vacuum with heating sufficient to produce a dry powder; 4) adding a light hydrocarbon, pentane for example, to slurry the powder; 5) adding a solution of the zirconocene in pentane or a minimum amount of toluene and stirring for 15–60 minutes at 20°–60° C.; 6) prepolymerizing with ethylene or other olefin in the pentane slurry and then collecting, rinsing and drying the catalyst. For best particle form, it is preferred to add no aluminoxane to the reactor beyond what is on the prepolymerized catalyst. An aluminum alkyl, such as triethylaluminum or triisobutylaluminum, can also be employed in the catalyst system.

A heterogeneous form of catalyst system is particularly suitable for a slurry polymerization procedure. In accordance with a preferred method of this invention, it is possible to utilize the alpha-olefin monomers in liquefied state as the polymerization diluent. As a practical limitation, slurry polymerization takes place in liquid diluents in which the polymer product is substantially insoluble. Preferably, the diluent for a slurry polymerization is one or more hydrocarbons with less than 5 carbon atoms. If desired, saturated hydrocarbons such as ethane, propane, or butane may be used in whole or part as the diluent. Likewise, the alpha-olefin monomer or a mixture of different alpha-olefin monomers may be used in whole or part as the diluent. Most preferably the diluent comprises in major part the alpha-olefin monomer or monomers to be polymerized.

A further understanding of the present invention and its object and advantages will be provided by the following examples.

EXAMPLE I

Bis(2-phenyl-tetrahydroindenyl) zirconium dichloride

To 20 ml of a diethylether solution of 2-phenyl-tetrahydroindene at 0° C. under argon in a Schlenk apparatus equipped with a side arm was slowly added 1.13 ml of a 2.62M solution of n-butyllithium in heptane to obtain a white suspension which was allowed to warm to room temperature for 2 hours. Then solid zirconium tetrachloride was added via the side arm and the reaction mixture was allowed to stir at room temperature for 24 hours. The resulting yellow suspension was pumped to dryness, titrated with benzene, and the mother liquor was concentrated in vacuo to provide a yellow solid identified as bis(2-phenyl-tetrahydroindenyl) zirconium dichloride.

EXAMPLE II

Bis(2-(para-methoxyphenyl) tetrahydroindenyl) zirconium dichloride

A solution was prepared by combining 1.3 mmol of 2-(paramethoxyphenyl) tetrahydroindene. This was reacted as in Example I with 1.46 mmol of n-butyllithium in a heptane solution. Then 0.6 mmol of zirconium tetrachloride was added via the side arm and the reaction mixture allowed to stir at room temperature for 24 hours. The crude product was purified by triturating with hexanes, filtering under argon, and invacuo removal of solvent to yield 533 mg of yellow solid which was identified as bis(2-(paramethoxyphenyl) tetrahydroindenyl zirconium dichloride.

EXAMPLE III

Bis(2-(para-methylphenyl) tetrahydroindenyl zirconium dichloride

In this case the procedure of Example I was used except 0.476 mmol of 2-(para-methylphenyl) tetrahydroindenyl, 0.52 mmol of butyllithium, and 0.242 of zirconium tetrachloride, and 4 ml of diethylether were employed. The solid was identified as bis(2-para-methylphenyl) tetrahydroindenyl zirconium dichloride.

EXAMPLE IV

Bis(2-(para-bromophenyl) tetrahydroindenyl) zirconium dichloride

Again the procedure of Example I was used but in this case 0.677 mmol of potassium hydride was used in place of the n-butyllithium and the starting material was 2-(para-bromophenyl) tetrahydroindene in the amount of 0.615 mmol in 8 ml of diethylether. The procedure employed 0.31 mmol of the zirconium tetrachloride. The resulting product was purified and identified as bis(2-(para-bromophenyl) tetrahydroindenyl) zirconium dichloride.

EXAMPLE V

Polymerization reactions were conducted to evaluate the effectiveness of various metallocenes in the polymerization of propylene.

The catalyst systems were prepared in an argon atmosphere in a glove box by placing the solid metallocene in a Diels Alder tube which was then sealed. Then 7.5 ml of a 10 wt % solution of methylaluminoxane in toluene was added to the tube via a syringe at room temperature. The tube was then swirled until the solid dissolved.

The polymerizations were conducted in a four-liter stainless-steel autoclave reactor equipped with a mechanical stirrer and automated temperature control. The catalyst system was withdrawn from the Diels Alder tube using a syringe and charged to the clean purged reactor through a small port with a counter-current flow of propylene gas. The reactor was then sealed and filled ⅔rds full of liquid propylene at room temperature. In some runs hydrogen was also added. The temperature of the mixture was then raised to the desired level by indirect heat transfer using steam heat. The reactor temperature was then maintained at this level for two hours and then the polymerization reaction was terminated by venting the liquid propylene to a flare. The venting took place in a few seconds. The reactor was then opened, and the polymer was removed. The polymer was dried in a vacuum oven for one hour and then weighed. The catalyst productivities were determined from the levels of zirconium in the polymer as determined by x-ray fluorescense. Molecular weights were determined by gel permeation chromatography.

One series of runs involved a series of polymerizations each using catalyst systems prepared using 8 mg of bis(2-(para-methoxyphenyl) tetrahydroindenyl zirconium dichloride. The results of those runs are summarized in Table 1.

TABLE I

| Run No. | °C. | g/g Catalyst | $M_w(\times 10^3)$ | $M_w/M_n$ | [m] % | [mm] % |
|---|---|---|---|---|---|---|
| 1 | 40 | 229 | 277 | 6.0 | 90.7 | 86.2 |
| 2 | 50 | 433 | 262 | 5.6 | 90.2 | 85.4 |
| 3 | 60 | 2350 | 131 | 5.2 | 86.8 | 80.7 |
| 4 | 70 | 1125 | 120 | 5.7 | 85.7 | 79.0 |
| 5* | 60 | 5720 | 11 | 3.1 | 74.2 | 62.8 |

*Employed hydrogen

The results in Table 1 demonstrate that the metallocene bis (2-(para-methoxyphenyl)tetrahydroindenyl zirconium dichloride was capable of producing polypropylene homopolymer having relatively high levels of isotactic microstructure. It appears that the level of isotactic microstructure is inversely related to temperature. A comparison of runs 3 and 5 indicates that hydrogen reduces the molecular weight of the polymer and reduces the production of isotactic microstructure. The runs carried out without hydrogen produced polymer having a molecular weight distribution that was broader than one would generally expect from a single site metallocene catalyst. The polymers had melting points in the range of 152.5° to 157° C. and heat of fusion values in the range of 51.2 to 70.5 j/g.

A similar series of rims were conducted using a catalyst system prepared using 3 mg of the metallocene bis(2-(para-bromophenyl) tetrahydroindenyl zirconium dichloride. Five reactions were carded out without hydrogen at temperature conditions differing by 10° C., from 30° to 70° C. While the catalyst system appeared to be much more active, the product of all those reactions was a low molecular weight sticky oil. The molecular weight distributions were less than 2 and the weight average molecular weights were in the range of 8,700 to 37,000, with the higher molecular weight products being produced at the lower reaction temperatures.

That which is claimed:

1. A process for producing a polymer in which the isotactic microstructure exceeds the atactic microstructure comprising contacting at least one olefin having at least three carbon atoms with a catalyst system prepared by combining a cocatalyst and bis(2-(para-methoxyphenyl) tetrahydroindenyl) zirconium dichloride.

2. A process according to claim 1 wherein said cocatalyst comprises an alkylaluminoxane.

3. A process according to claim 2 wherein the polymerization is conducted under particle form conditions such that the end product polymer is insoluble in the polymerization medium.

4. A process according to claim 3 wherein propylene is polymerized.

5. A process according to claim 4 wherein said cocatalyst comprises methylaluminoxane.

6. A process according to claim 5 wherein propylene is homopolymerized.

7. A process according to claim 6 wherein the polymerization is conducted at a temperature in the range of about 40° C. to about 70° C.

8. A process according to claim 1 carried out to produce a homopolymer of propylene having a [mm] as determined from $C^{13}$NMR of at least about 62.8%.

9. A process according to claim 7 carried out to produce a homopolymer of propylene having a [mm] as determined from $C^{13}$NMR of at least about 79%.

10. A process according to claim 7 conducted without the addition of hydrogen.

11. A process according to claim 1 wherein said cocatalyst comprises a cocatalyst selected from the group consisting of alkylaluminoxanes and triphenyl carbenium tetrakis (pentafluorophenyl) boronate.

12. A process according to claim 2 wherein said cocatalyst comprises methylaluminoxane.

13. A process according to claim 12 wherein the polymerization is conducted at a temperature in the range of 40° C. to 70° C.

14. A process according to claim 13 conducted in the absence of added hydrogen.

15. An isotactic stereoselective polymerization process comprising contacting at least one olefin having at least three carbon atoms with a catalyst system prepared by combining bis(2-(para-methoxyphenyl) tetrahydroindenyl) zirconium dichloride and a cocatalyst selected from organo metallic compounds of metals of Groups IA, IIA, and IIB of the Periodic Table.

16. A process according to claim 15 wherein the cocatalyst comprises an alkylaluminoxane.

17. A process according to claim 15 wherein the cocatalyst comprises triphenyl carbenium tetrakis (pentafluorophenyl) boronate.

* * * * *